Figure 1:
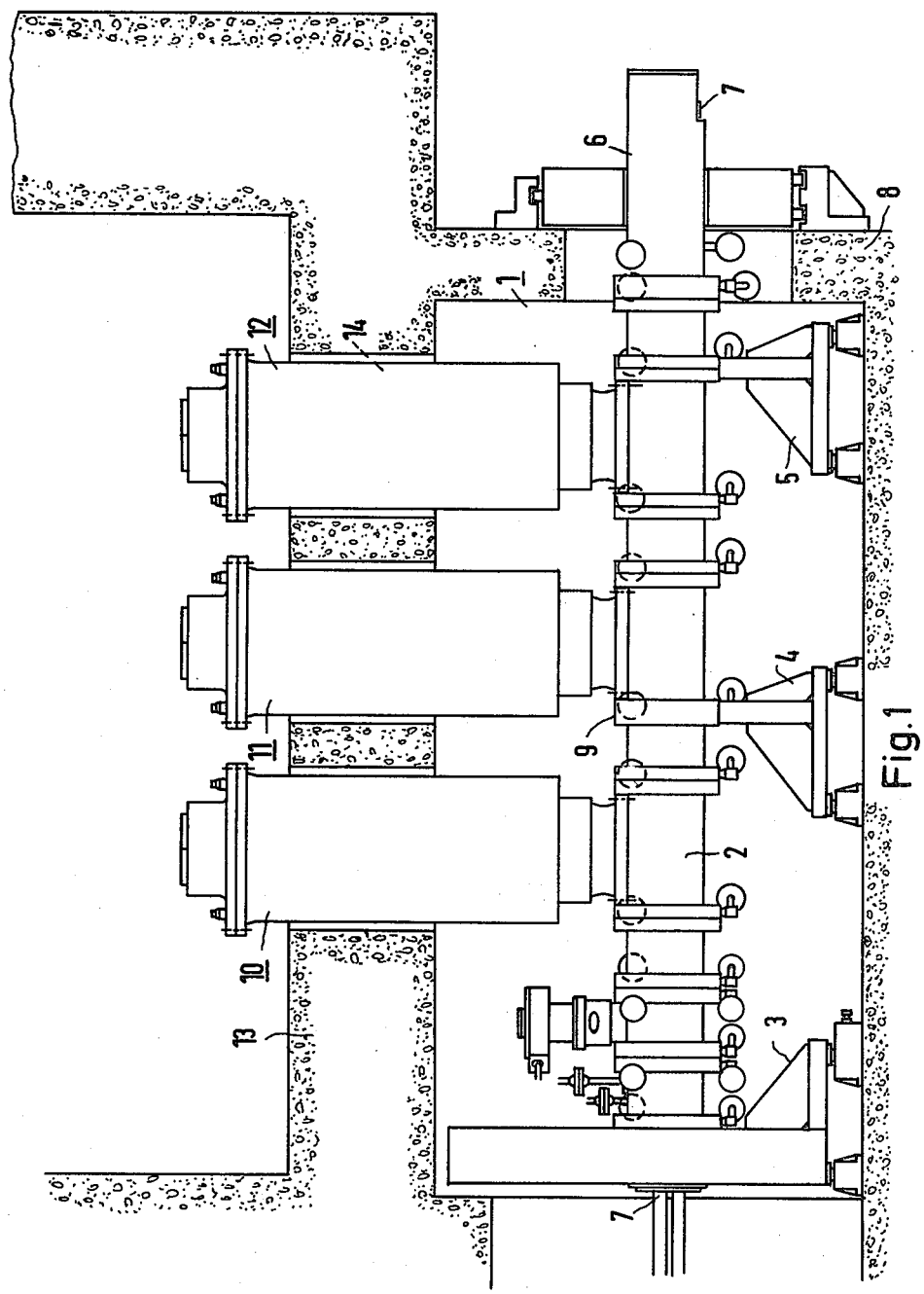

United States Patent [19]

Meintker et al.

[11] 4,242,001
[45] Dec. 30, 1980

[54] WORM EXTRUDER ASSEMBLY

[75] Inventors: Manfred Meintker, Erlangen; Anwer Puthawala, Buckenhof; Hans-Peter Schabert, Erlangen; Erich Strickroth, Buckenhof, all of Fed. Rep. of Germany

[73] Assignee: Kraftwerk Union Aktiengesellschaft, Mülheim, Fed. Rep. of Germany

[21] Appl. No.: 938,015

[22] Filed: Aug. 30, 1978

[30] Foreign Application Priority Data

Sep. 8, 1977 [DE] Fed. Rep. of Germany ....... 2740490

[51] Int. Cl.² ............... B01F 15/06; G21F 9/02; G21F 9/16
[52] U.S. Cl. ........................... 366/75; 165/110; 165/155; 165/156; 165/163; 366/22; 366/24; 366/144; 366/147; 422/159; 422/903
[58] Field of Search ............... 165/110, 155, 156, 163; 366/22, 64, 24, 75, 147, 144; 202/182, 185 R, 185 E, 187; 252/301.1 W; 250/306, 307; 422/159; 159/DIG. 12

[56] References Cited

U.S. PATENT DOCUMENTS

| 921,811 | 5/1909 | Deckebach | 202/185 E |
| 2,398,836 | 4/1946 | Lea | 202/187 |
| 2,561,424 | 7/1951 | Spieth | 165/110 |
| 2,955,990 | 10/1960 | Smith | 202/187 |
| 3,971,732 | 7/1976 | Meier | 252/301.1 W |

*Primary Examiner*—Deborah L. Kyle
*Attorney, Agent, or Firm*—Herbert L. Lerner

[57] ABSTRACT

Worm extruder assembly includes an extruder worm, a steam dome formed as a cylindrical tube disposed transversely to the worm axis, a condenser surrounding the cylindrical tube, a steam outlet line extending from the steam dome to the condenser, and means defining an annular gap connecting the condenser to the cylindrical tube.

9 Claims, 3 Drawing Figures

WORM EXTRUDER ASSEMBLY

The invention relates to a worm extruder assembly having a steam discharge line, extending from a steam dome to a condenser, the steam dome being, in substance, a tube extending transversely to the worm axis.

In a worm extruder assembly heretofore known from U.S. Pat. No. 3,971,732, which is employed for embedding radioactive waste in an enveloping substance, such as bitumen, for example the condenser is connected by means of a tube which is attached at one end thereof to the steam dome and can have, at most, a diameter equal to that of the steam dome. In this heretofore known construction, difficulties are encountered due to the limitation of the cross section and the fact that the connecting location or joint has edges which promote the deposition of bitumen and salts which are entrainable drop-wise with the discharging steam.

It is an object of the invention to provide a worm extruder assembly of the foregoing general type with an economical, costeffective condenser which is to precipitate the discharging steam so that the discharge or escape of activity carriers is reliably prevented, while simultaneously affording good inspection and cleaning possibilities.

With the foregoing and other objects in view, there is provided, in accordance with the invention, a worm extruder assembly comprising an extruder worm, a steam dome formed as a cylindrical tube disposed transversely to the worm axis, a condenser surrounding the cylindrical tube, a steam outlet line extending from the steam dome to the condenser, and means defining an annular gap connecting the condenser to the cylindrical tube.

Through the annular gap, the steam delivered into the steam dome can be transferred with a large exposure area into the condenser. Direct connection of the condenser to the steam dome simultaneously avoids a necessity for pipelines which can become soiled or fouled. In addition, good inspection and cleaning possibilities are obtained in spite of the compact construction, as will be described hereinafter.

In accordance with another feature of the invention, the annular gap is located at a free end of the cylindrical tube and communicates with an annular chamber enclosing the cylindrical tube and forming part of the condenser.

In accordance with a further feature of the invention, a common cover closes both the cylindrical tube and the annular chamber so that they are both directly available for inspection and cleaning after the cover is removed.

In accordance with an added feature of the invention, a pair of adjacent windows are formed in the cover for viewing the cylindrical tube and the condenser.

This saves opening the common cover to check the extent of contamination of the steam dome and the condenser. The adjacent viewing windows, which are preferably of identical construction permit the interior of the tube and the condenser to be illuminated with an external light source without interfering with the observation or viewing thereof.

In accordance with an additional feature of the invention, the condenser comprises a tube coil for coolant, the tube coil surrounding the cylindrical tube. The coolant is particularly thought of as being water, unless special cooling liquids are to be used such as are known in refrigeration engineering.

In accordance with yet another feature of the invention, the tube coil is disposed in the annular chamber and is secured to the common cover. It can then be lifted out directly when the cover is removed and can therefore be cleaned readily.

This is true especially, in accordance with yet a further feature of the invention, wherein the tube coil is of bifilar and spiral construction and is secured at both ends thereof to the common cover. It is also conceivable, however, to equip the condenser with a plate-type cooler instead of a tube coil for condensing the steam.

In accordance with yet an added feature of the invention, a steam jacket is disposed between the cylindrical tube and the condenser for heating the tube. It was surprisingly found that also for such a construction a compact overall structure can be retained, which permits the condenser to be disposed directly at the worm extruder per se. It is furthermore possible, with such a heating jacket, to meter the heating of the steam dome, for preventing settling of bitumen and impurities, so that the heat transfer into the condenser remains within permissible limits.

In accordance with a concomitant feature of the invention, means are provided for defining a cylindrical gap between the condenser and the steam jacket.

This construction ensures that only a short connection is available for the heat transfer, while the air in the annular gap, preferably outside or ambient air, acts as heat insulation.

Other features which are considered as characteristic for the invention are set forth in the appended claims.

Although the invention is illustrated and described herein as embodied in worm extruder assembly, it is nevertheless not intended to be limited to the details shown, since various modifications and structural changes may be made therein without departing from the spirit of the invention and within the scope and range of equivalents of the claims.

Figure 2:
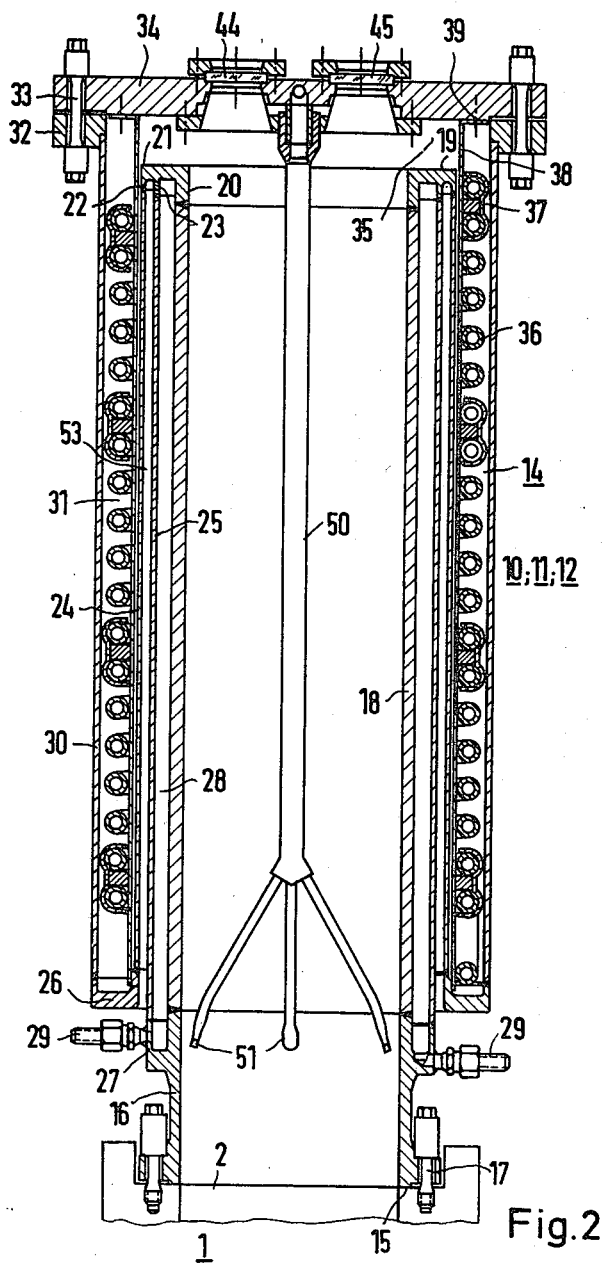
Figure 3:
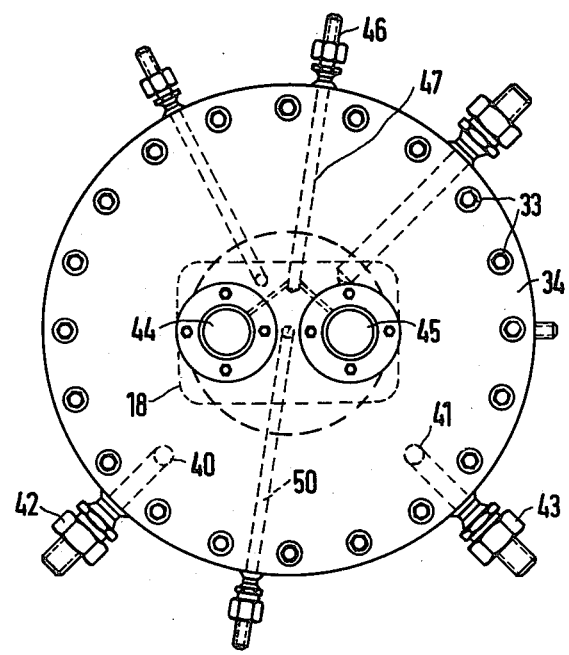

The construction and method of operation of the invention, however, together with additional objects and advantages thereof will be best understood from the following description of specific embodiments when read in connection with the accompanying drawing, in which:

FIG. 1 is a diagrammatic side elevational view of the worm extruder assembly according to the invention; and FIGS. 2 and 3 are enlarged fragmentary vertical sectional and top plan views, respectively, of FIG. 1 showing one of the condensers of the worm extender assembly.

Referring now to the drawing and first, particularly to FIG. 1 thereof, there is shown a worm extruder assembly or machine 1 for embedding in bitumin waste having a weak to medium activity range from a cooling-water treatment plant of a pressurized-water power reactor, the bitumen being subsequently fed into drums for ultimate storage of the radioactive waste. The worm extruder assembly 1 includes a worm housing 2 which is flanged together from several parts and rests on supports 3, 4 and 5. On the right-hand side, as viewed in FIG. 1, an outlet 7 is provided at an end 6 of the housing 2. Non-illustrated drums are normally disposed in readiness below the outlet 7 to receive the waste-bitumin mixture. The entire machine 1 is mounted in a concrete structure 8 for radiation shielding.

On the upper side 9 of the worm extruder machine 1, as viewed in FIG. 1, three steam domes 10, 11 and 12 are provided which are of identical construction and protrude through openings formed in a part 13 of the concrete wall 8. The steam domes 10, 11 and 12 are combined with condensers 14, which are shown in greater detail in FIGS. 2 and 3.

The steam domes 10, 11 and 12, in vicinity of the lower end face 15 thereof, as viewed in FIG. 2, i.e. at location thereof at which it is in contact with the worm housing 2 of the worm extruder assembly 1, is provided with a tube length 16 of rectangular cross section which is pressed against the housing 2 by necked-down or expansion bolts 17. The tube length 16 is joined at the top thereof, as viewed in FIG. 2, by a tube 18 likewise of rectangular cross section and having a free end face 19 formed by a flange member 20. The flange member 20 has a round outer rim 21 and is formed with two lips 22 and 23. Concentric or coaxial tubes 24 and 25 of circular cross section are secured to and extend downwardly, as viewed in FIG. 2, from the lips 22 and 23, respectively.

To the bottom of the outer tube 24, as viewed in FIG. 2, there is welded a shaped member 26 having a substantially U-shaped cross section. The inner tube 25 extends to a projection 27 which forms part of the tube length 16. A jacket 28 is consequently formed between the tube 18 of rectangular cross section and the circular tube 25, and is heatable by steam through connecting unions 29. In the embodiment of the instant application, the steam is saturated low-pressure steam of 10 bar.

From the shaped member 26, a tube 30 extends upwardly, as viewed in FIG. 2, and together with the tube 24 encloses a cylindrical annular chamber 31. A flange 32 is welded to the free end of the tube 30. A cover 34 is fastened by necked-down or expansion bolts 33 to the flange 32 and closes off both the tube 18 of the respective steam dome 10, 11, 12 and the annular chamber 31, as clearly shown in FIG. 2.

The annular chamber 31 serves as a condenser which is connected to the tube 18 at the free end 19 thereof by means of an annular gap 35. For cooling, the condenser 14 contains a bifilar or double-wound spiral tube 36 which is mounted by clamps or clips 37 to retaining straps 38. The retaining straps 28 are pressed against the cover 34 from below by means of screws 39. The tube spiral or coil 36 has two ends 40 and 41 which are also fastened to the cover 34, as shown in FIG. 3. Thus, the tube coil 36 can be supplied with cooling water from connecting nipples or unions 42 and 43 of the cover 34.

In the illustrated embodiment of the invention, the cover 34 is provided with two viewing windows 44 and 45 which permit inspection of the steam dome 10, 11 and 12 and of the condenser 14. In this regard, one of the viewing windows can be used for observation and the other for illustration by a suitable light source.

As is apparent especially from FIG. 3, a cleaning agent can be sprayed against the viewing windows 44 and 45 from an external connecting union 46 through a channel 47 formed in the cover 34 so as to loosen any dirt or soil that might have settled there. The channel 47 can also be used for flushing or spraying the inside of the tube 18, unless a separate steam pipe 50 is provided which, in the illustrated embodiment, extends with outlet connecting unions or nozzles 51 to within the region of the tube wall.

FIG. 2 shows that the condenser 14 is connected to the steam jacket 28 only one end by means of the flange member 20, while an air gap 53, which is in communication with the outside air, acts as heat insulation along substantially the entire length of the jacket 28. Therefore, only small heat losses occur in direction from the steam jacket 28 to the condenser 14, notwithstanding the compact construction which is clearly apparent from the drawing.

There is claimed:

1. Worm extruder assembly comprising an extruder worm, a steam dome formed as a cylindrical tube disposed transversely to the worm axis, said tube communicating at one end thereof with said extruder worm and being free and open at the other end thereof, a condenser surrounding said cylindrical tube, and steam outlet means extending from said steam dome to said condenser, said steam outlet means defining an annular gap connecting said condenser to said cylindrical tube at said free and open end of said tube.

2. Worm extruder assembly according to claim 1 wherein said annular gap communicates with an annular chamber enclosing said cylindrical tube.

3. Worm extruder assembly according to claim 2 including a common cover closing both said cylindrical tube and said annular chamber.

4. Worm extruder assembly according to claim 3 including a pair of adjacent windows formed in said cover for viewing said cylindrical tube and said condenser.

5. Worm extruder assembly according to claim 1 wherein said condenser comprises a tube coil for coolant, said tube coil surrounding said cylindrical tube.

6. Worm extruder assembly according to claim 5 wherein said tube coil is disposed in said annular chamber and is secured to said common cover.

7. Worm extruder assembly according to claim 6 wherein said tube coil is of bifilar and spiral construction and is secured at both ends thereof to said common cover.

8. Worm extruder assembly according to claim 1 including a steam jacket disposed between said cylindrical tube and said condenser for heating said tube.

9. Worm extruder assembly according to claim 8 including means defining a cylindrical gap between said condenser and said steam jacket.

* * * * *